United States Patent [19]
Leitner

[11] 3,956,803
[45] May 18, 1976

[54] FASTENER

[76] Inventor: Kajetan Leitner, Am Winacker 18, D-8170 Bad Tolz, Germany

[22] Filed: June 3, 1974

[21] Appl. No.: 475,896

[30] Foreign Application Priority Data
June 4, 1973 Germany.......................... 2328412

[52] U.S. Cl............................................. 24/221 R
[51] Int. Cl.²......................................... A44B 17/00
[58] Field of Search............... 24/221 R, 221 A, 98, 24/212, 73 RM; 85/5 R, 1 S

[56] References Cited
UNITED STATES PATENTS

| | | | |
|---|---|---|---|
| 1,785,709 | 12/1930 | Campau | 24/221 R |
| 2,126,482 | 8/1938 | Lombard | 85/5 R |
| 2,403,247 | 7/1946 | Sullivan | 24/221 A |
| 3,571,864 | 3/1971 | Oger | 24/221 R |
| 3,578,374 | 5/1971 | Glassmeyer | 24/221 R |
| 3,583,039 | 6/1971 | Walker | 24/221 R |

Primary Examiner—Donald A. Griffin
Attorney, Agent, or Firm—O'Brien & Marks

[57] ABSTRACT

A fastener device for detachably connecting panels with aligned round holes includes a retainer having a head portion and an offset foot portion interconnected by a cylindrical shank, and a lock bushing mounted on the cylindrical shank to engage the panels whereby rotation of the head portion displaces the foot portion which engages the opposite side of the panel.

8 Claims, 21 Drawing Figures

FASTENER

The invention relates to a fastener for the detachable connection of panel components with round holes which have substantially the same size and through which the fastener is inserted from one side and is secured.

Fasteners of this kind are required, for example, for attaching inscription plates to panels the rear of which is not accessible if the inscription plates have to be repeatedly exchanged. In such a case fasteners must be inserted from the side of the inscription plate into apertures which extend through the inscription plate and through the affected panel and the fasteners must be secured from the front.

This problem has already been solved by means of a rotary closure with radial projections which extend behind the panel and which calls for apertures of appropriate elongated shape to enable such fasteners to be inserted. Rotation of the rotary closures causes the projections to grip behind the panel material so that the closure and the component to be attached is secured in this manner.

The use of apertures with the characteristics of a slot involves difficulties in all cases, more particularly if the panels on which the components are to be attached are hollow members, for example tubes, in which elongated holes can be provided only with difficulty.

It is the object of the invention to provide a fastener which can provide a detachable connection even if the holes are circular. Furthermore, it is important to construct the fastener with sufficient simplicity to render it suitable for mass production, more particularly for production by injection moulding from plastics. The fastener according to the invention is characterized by a retaining part with a cylindrical shank which joins two radial projections between which are disposed the components which are to be retained together, and a locking part which is rotatably mounted on the shank by means of a bush which is eccentric with respect to the cylinder and is substantially in axial alignment with one projection when suitably adjusted so that it fits into the apertures together with the projection and on being rotated displaces the projections with respect to the edges of the apertures in the aforementioned components.

Owing to the eccentric configuration of the retaining part and the locking part rotation of the latter in the apertures results in displacement of the retaining part so that the projections thereof grip behind the edges of the apertures. The retaining part and the locking part represent very simple components.

Conveniently, the locking part is constructed with an eccentric bore diameter is adapted to the shank and expands in a slit over the external surface of the shank so as to produce a bush of crescent-shaped cross-section with slightly converging ends which engage resiliently around the shank. A locking part constructed in this manner can be subsequently connected to the retaining part in simple manner by ratchet means so that no further components are required for this kind of connection.

In order to facilitate operation of the locking part after insertion of the fastener the bush is conveniently constructed so that a lever operating element extends from the said bush in the axial orientation on the side which faces away from the projection which is in flush alignment with the bush. Pivoting the operating element in the manner of a lever causes corotation of the bush, i.e of the locking part, so that a result of the eccentric action between the locking part and the retaining part the latter is displaced and is located behind the edges of the apertures.

In order to impart a defined pivoting range to the operating element the projection nearest the side thereof can be provided with stop abutments which impart to the operating element a pivoting range through approximately 180°, one stop abutment imparting to the operating element a position in which the bush and the other projection are in flush alignment. It is only when the operating element is pivoted from the last-mentioned position through 180° that the retaining part is also displaced into its extreme position in which it performs the securing function.

In order to facilitate the retaining part action of gripping behind the edges of the apertures of the components which are to be joined to each other the side of the projection which is in flush alignment with the bush and is nearest to the components can be lightly chamfered in the manner of a truncated cone. The chamfer ensures that when the locking part is pivoted the projections can slide easily behind the edges of the apertures in the components without abutting against the internal surfaces of such apertures. The chamfering also permits compensation to a specific extent of thickness tolerances of the components which are to be joined to each other. The chamfering also achieves the effect of pressing together of the components which are first gripped by the chamfered zone when the retaining part is displaced, the chamfered zone then slides over the edge of the apertures to compress the components by virtue of the chamfering.

The effect of compressing the components can be increased still further if the projection which is in flush alignment with the bush is additionally constructed in duncate form in order to produce a resilient zone. To this end, the obtuse angle of the conical chamfer can be slightly reduced to result in an increased compressing effect when the locking part is displaced, to enable the resilient zone to yield, thus ensuring that the locking part can always rotate fully and the retaining part can also be slid to its fullest extent.

The operating element of the fastener according to the invention can also be locked. To this end, the fastener is provided with a lid which fits on the side with the operating element to lock the latter in its locked state. The lid also forms an optically attractive closure.

The locking part can be inserted into the front component with a press fit in order to avoid self-loosening of the fastener, for example due to vibrations, substantial friction securing the retaining part and the locking part against rotation when they are in the locked state. In practice, the fastener cannot become loose in the locked state. In order to render deliberate loosening of the fastener more difficult the said fastener is advantageously constructed so that it does not extend beyond the appropriate projection of the retaining part, the end face of the shaft on the side of the said projection being provided with a slit for a screwdriver. The operating element cannot in practice be gripped with fingers when the fastener is constructed in the manner described above, instead it is necessary for the retaining part itself to be rotated to which end a tool has to be used, namely a screwdriver which fits into the slot.

When using a fastener whose locking part is inserted with a press fit into the front component the retaining part projection which faces away from the front component performs a rotating motion during the locking operation in the course of which motion the said projection slides progressively over the surface of the above-mentioned component. To avoid jamming of the projection on the rear component (the projection in flush alignment with the bush when the fastener is inserted) and to progressively press the two components to be joined against each other as rotation is continued, the projection which is in flush alignment with the bush can be chamfered on the side nearest to the components in such a way as to produce an inclined ramp which progressively presses the component against each other in the sense of locking when the retaining part is rotated.

Insertion of the fastener into the apertures of the components which are to be joined to each other can be facilitated by imparting a barrelled construction to the projection which is to be inserted. Advantageously, both projections are barrelled in this case, the effect of this for the frontal projection being to render manual detachment more difficult.

Embodiments of the invention are illustrated in the accompanying drawings in which.

Figure 1:
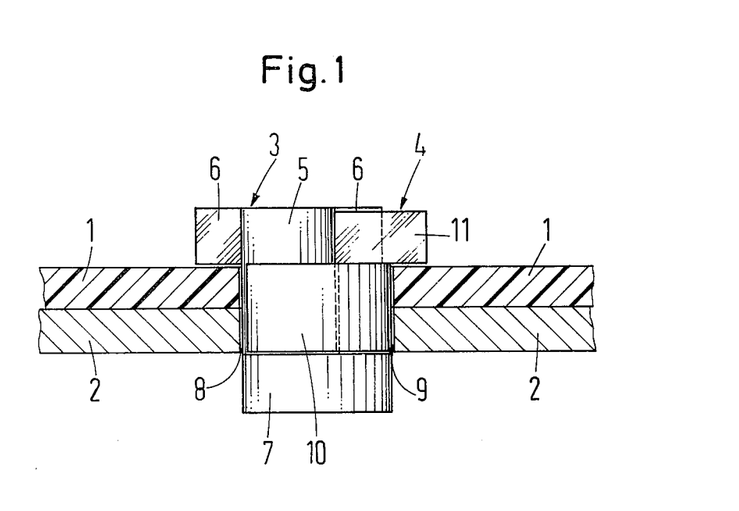
FIG. 1 shows the fastener in conjunction with two panels which are to be retained together in state in which the fastener is insertable into the apertures in the panels.

FIG. 1 shows a section of two panels 1, 2 which are to be detachably joined to each other by means of the fastener according to the invention. The two panels may for example comprise an inscription plate which is to be mounted on a wall but it is also possible that one of the two panels represents a hollow member the interior of which is inaccessible when the fastener is attached and operated. This would refer to the space below the panel 2. The fastener comprises the retaining part 3 and the locking part 4.

Figure 3:
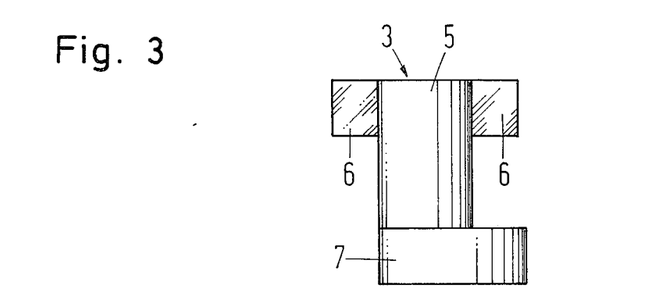
FIG. 3 shows the retaining part by itself as a side view.
Figure 4:
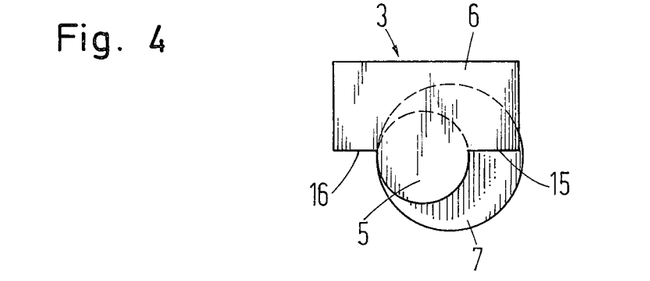
FIG. 4 shows the retaining part by itself as a plan view.
Figure 5:
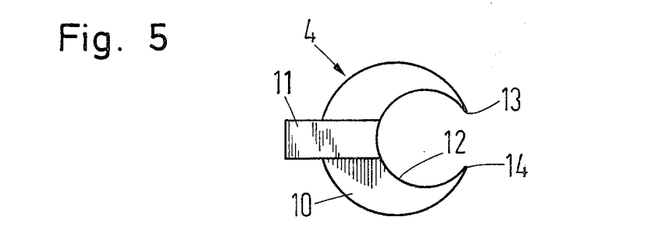
FIG. 5 shows the locking part as a plan view.

Reference should also be made to FIGS. 3, 4 and 5 to explain the construction and method of operation of the retaining parts 3 and locking part 4, these parts being shown individually in the aforementioned Figures.

Figure 2:
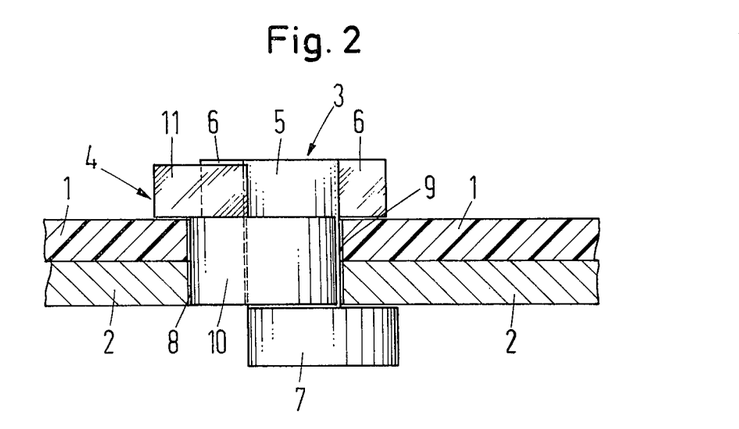
FIG. 2 shows the same fastener with the panels but in the locked position in which the locking part is rotated through 180° relative to the position illustrated in FIG. 1.

The retaining part 3 comprises a cylindrical shank 5 which connects a top projection 6 and a bottom projection 7. In the locked state the projections, which extend radially from the shank 5, are situated behind the surface of the panels 1 and 2 and therefore retain these together. The locked position is illustrated in FIG. 2. The top projection 6 is constructed in the form of a plate and the bottom projection 7 represents a cylindrical section (see FIG. 5) whose diameter is selected so that the projection 7 can be inserted through the circular apertures 8 and 9 in the panels 1 and 2.

The locking part 4, comprising a cylindrical bush 10 and an operating element 11, is ratchet-mounted on the cylindrical shank 5 of the retaining part 3. The cylindrical bush has an external diameter which is selected in the same way as the diameter of the bottom projection 7 so that the bush 10 can be inserted through the apertures 8 and 9 in the panels 1 and 2. In order to ensure good seating in the apertures 8 and 9 the diameters of the bottom projection 7 and of the bush 10 are only slightly smaller than the diameters of the apertures 8 and 9. The bush 10 is provided with a bore 12 which is eccentric in relation to the bush and is adapted to the diameter of the cylindrical shank 5 so that the bush 10 can be rotated without clearance around the shank 5 when the retaining part 3 and the locking part 4 are assembled. The bore 12 is disposed in the bush 10 so that the latter is opened in the manner of a slit so that the bush 10 has a crescent-shaped cross-section as shown in FIG. 5 with slightly converging ends 13 and 14. The ends 13 and 14 therefore constrict the space surrounded by the bush 10 and represented by the bore 12 so that the said bush 10 can be thrust over the shank 5 of the retaining part 3 if the said bush is sufficiently resilient, the ends 13 and 14 being in ratchet-engagement behind the shank 5. The ends 13 and 14 encompass the shank to a specific extent and because of their resilience retain the bush 10 on the shank 5.

In order to confer the necessary resilient properties on the bush 10 the latter is advantageously constructed of a plastics material.

The bush 10, ratchet-mounted as described above, can then be rotated about the shank to which end the operating element 11 is appropriately pivoted to and fro. In the relative position of the retaining part 3 and of the locking part 4 as shown in FIG. 1 the bush 10 and the bottom projection 7 are in flush alignment with each other so that, as shown, the bottom projection 7 and the bush 10 can be guided through the apertures 8 and 9 in the panels 1 and 2. If the bush 10 is rotated about the shank 5 of the retaining part 3 by pivoting the operating element 11 the eccentricity between the bore 12 and the bush 10 will cause displacement between the projections 6 and 7. The bush 10 is inserted through the apertures 8 and 9 so that the shank 5 of the retaining part 3 must be deflected when the bush 10 is rotated and thus, entrains the projections 6 and 7 which will then be situated behind the surfaces of the panels 1 and 2 as shown in FIG. 2, so that the said panels are joined to each other. The height of the bush 10 is appropriately selected so that it is slightly shorter than the sum of the thicknesses of the panels 1 and 2 to ensure proper location of the bush 10 in the apertures 8 and 9. The bush 10 can also be made shorter but it should project into the two apertures 8 and 9 so that the bush 10, which radially fills the apertures 8 and 9, cannot displace the panels 1 and 2 relative to each other. In this connection it should be mentioned that more than two panels can be joined to each other in the manner described hereinabove by means of the fastener.

The distance between the projections 6 and 7 is advantageously selected so as to grip around the surfaces of the panels 1 and 2 when these abut against each other so that the fastener joins the panels 1 and 2 to each other without clearance.

The connection illustrated in FIG. 2 can be detached at any time by backward pivoting of the operating element 11 so that the bush 10 resumes the position illustrated in FIG. 1 to enable the fastener to be removed from the apertures 8 and 9. The panels 1 and 2 will then fall apart.

The operating element 11 comprises a lug which extends from the bush 10 on the side of the top projection 6 and is integral with the bush 10. Advantageously, the locking part comprising the bush 10 and the operating element 11 is produced by injection moulding from plastics.

The top projection 6 in this case is constructed so that it forms a stop abutment for the two positions of the operating element as illustrated in FIGS. 1 and 2. In FIG. 4 these stop abutments are designated with the numerals 15 and 16. The stop abutments 15 and 16 provide the operating element 11 with a pivoting range of 180°. In one position (FIG. 1) the bush 10 and the bottom projection 7 will be in flush alignment and in the other position the projections 6 and 7 will be displaced relative to each other to the maximum possible extent.

Figure 6:
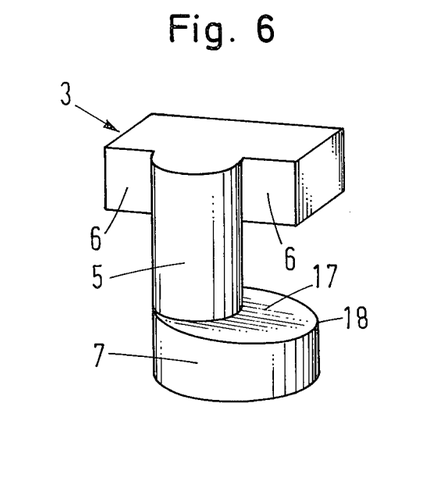
FIG. 6 shows the retaining part with a slightly chamfered projection.

FIG. 6 shows an embodiment in which the side of the projection 7 nearest to the components which are to be joined is provided with slight chamfering 17 in the manner of a truncated cone. When the projection 7 formed in this way displaces itself with respect to one panel when the bush 10 is rotated the chamfered zone 17 causes its outer edge 18 to be positioned behind the appropriate edge of a panel, initially without exerting any pressure, but increasing displacement of the projection 7 causes the chamfered zone 17 to exert a correspondingly increasing pressure on the panels which are to be joined to each other. On the one hand this facilitates the operation of joining and on the other hand it enables tolerances in the thickness of the panels which are to be joined to each other to be compensated to a certain extent.

Figure 7:
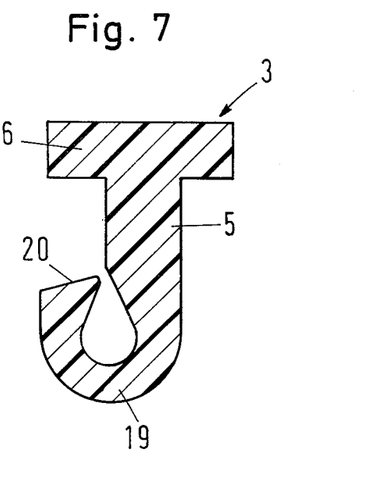
FIG. 7 shows a retaining part with a duncate projection.

A particularly substantial compensation of tolerances is achieved by the construction according to FIG. 7 in which the bottom projection is constructed in the manner of a hook 19 to produce a resilient zone in the region of the said hook 19. In this construction it is also possible to provide a chamfered zone 20 with a steeper angle so that progressive displacement of the retaining part 3 causes a substantial pressure to be exerted on the panels which are to be joined to each other so that the said pressure can be resiliently absorbed by the resilient zone formed by the hook 19 when the panels cannot yield any further.

Figures 8, 9:
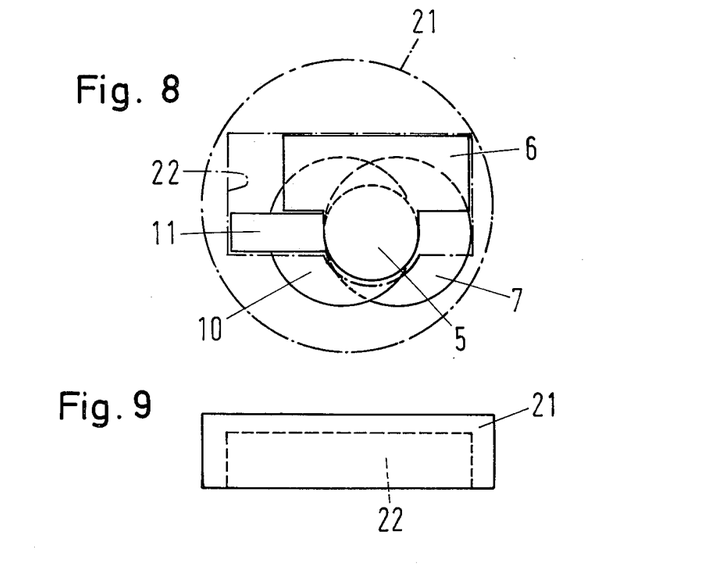
FIG. 8 shows the fastener of FIG. 2 as a plan view with a lid indicated in dash dot lines.
FIG. 9 shows a side view of the lid.

FIG. 8 shows a plan view of the fastener in the fastened position (see FIG. 2), a lid 21 having been inverted over the fastener element 11 and over the projection 6 for the purpose of locking the said fastener, the interior of the lid having a recess 22 which surrounds the projection 6, the operating element 11 and the shank 5 so that the operating element 11 is retained relative to the projection 6. The lid also forms an optically attractive closure.

The lid 21 is shown as a side view in FIG. 9. As can be seen by reference to the drawings the recess 22 extends into the lid so that sufficient material remains around the recess 22 to provide the lid with the necessary stability.

The recess 22 of the lid 21 in this case is so dimensioned that the said lid 21 is clamped on the projection 6 with the shank 5. The clamping action can of course be reinforced through ratchet action, for example by providing the projection 6 with a corresponding undercut behind which the correspondingly shaped recess is situated. This ensures that the connecting element cannot be subsequently opened by hand, instead it calls for the use of a tool by means of which the lid 21 is again lifted.

Since the lid retains the operating element 11 and the projection 6 in the locked position it is possible to construct the retaining part 3 and the locking part 4 of the fastener so that these parts and their projections 6 and 7 retain the panels 1 and 2, i.e. the components which are to be joined to each other, with clearance. Self-unlocking of the fastener, for example through shaking, is prevented by the lid 21.

FIGS. 10 to 13 show a retaining part 3 and a locking part 4 the latter being inserted with a press fit into a front component and the retaining part 3 as well as the locking part 4 being constructed so that substantial friction prevents the said two parts from rotating when they are in the locked state. This means that the bore 12 of the locking part 4 is so narrow that it closes tightly around the shank 5 of the retaining part 3. The bush 10 of the locking part 4 is additionally provided with ribs 23 for additionally securing the retaining part 4 in the front component but the function of such ribs will be described in detail in relation to FIG. 14.

The two sides of the retaining part 3 are provided with the projections 24 and 25 which in this case are of barrelled construction. The barrelled construction of the projection 25 facilitates the insertion of the fastener into the apertures of components which are to be joined to each other. In conjunction with the operating element 30 of the locking part 4 the barrelled construction of the projection 24 practically prevents manual detachment of the locked fastener. The operating element 30 does not extend beyond the projection 24 and accordingly has merely a limiting action regarding the rotation of the retaining part 3 relative to the locking part 4. In order to prevent such rotation altogether in this case and which is obtained only for the retaining part 3 in this case because of the press fit of the locking part 4 in the affected component, the projection 24 of the said retaining part 3 is provided with a slot 26 for a screwdriver.

The method of operation of the fastener illustrated in FIGS. 10 to 13 will now be explained by reference to FIG. 14. This Figure shows the fastener in the locked state when it joins the two panels 1 and 2 to each other. The bush 10 in this case is pressed with a press fit into the panel 1 the inclined end face of the ribs 23 enabling the latter to become particularly reliably anchored in the material of the panel 1. It is assumed that the material of the panel 1 is a correspondingly resilient material, for example cardboard. This mode of anchoring the bush 10 in the panel 1 enables the retaining part and its shank 5 to be rotated relative to the bush 10 to which end a screwdriver is inserted into the slot 26 and to be correspondingly rotated until the operating element 30 abuts against the corresponding end face of the projection 24. Manual rotation of the projection 24 with respect to the operating element 30 is practically impossible because the said operating element 30 does not extend beyond the projection 24.

Figure 10:
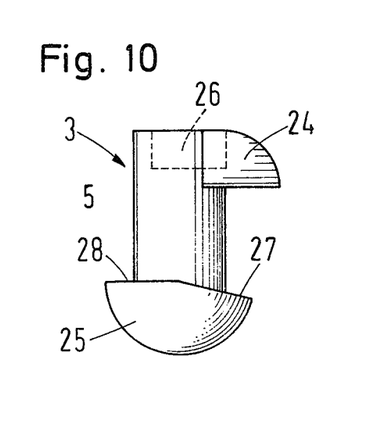
FIG. 10 shows a retaining part with projections constructed in barrelled form and with a slot to permit rotation by means of a screwdriver.
Figure 11:
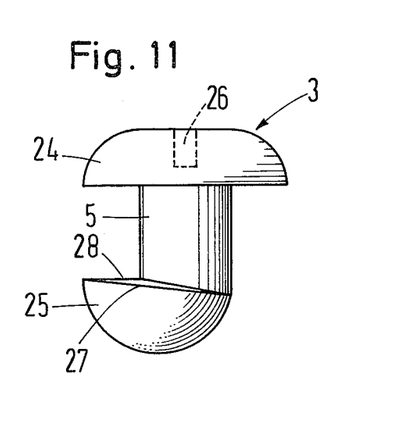
FIG. 11 shows the same retaining part rotated through 90°.
Figures 12, 13, 14:
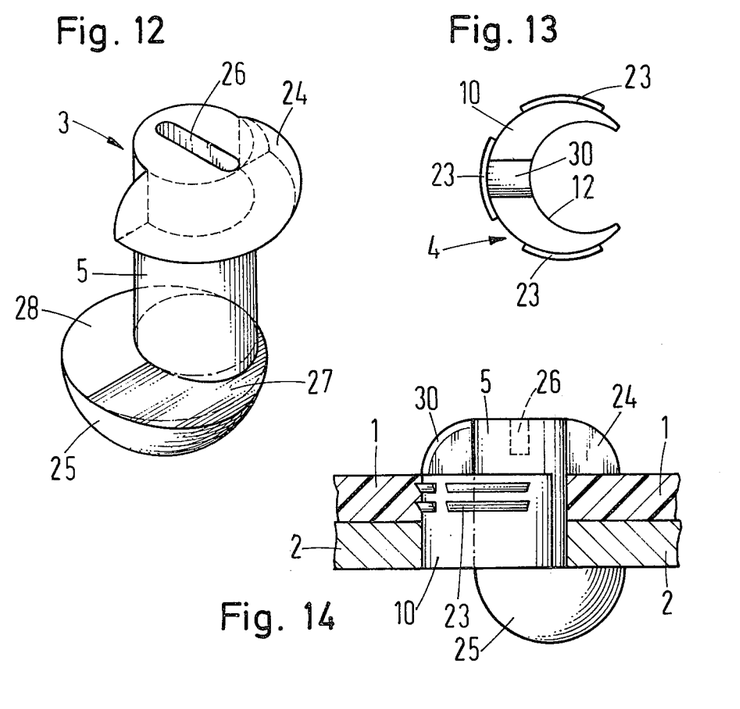
FIG. 12 shows the same retaining part as a perspective view.
FIG. 13 shows the associated locking part which is to be inserted with a press fit into the frontal component.
FIG. 14 shows the assembly of the retaining part in accordance with FIGS. 10 to 12 and the locking part in accordance with FIG. 13 in the locked state together with two components which are to be joined to each other.
Figure 15:
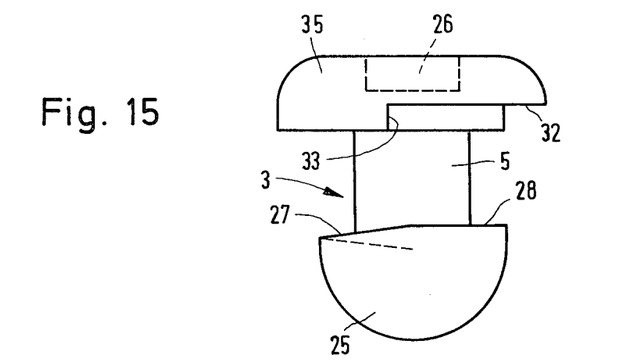
FIGS. 15 to 21 show a fastener similar to that of FIGS. 10 to 14, the retaining part being provided with a mushroom-shaped, circular projection.
Figure 16:
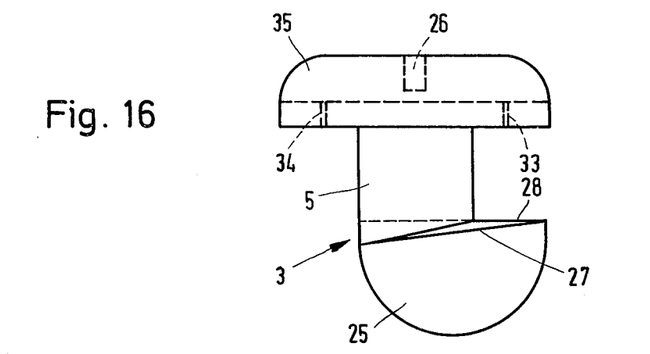
Figure 17:
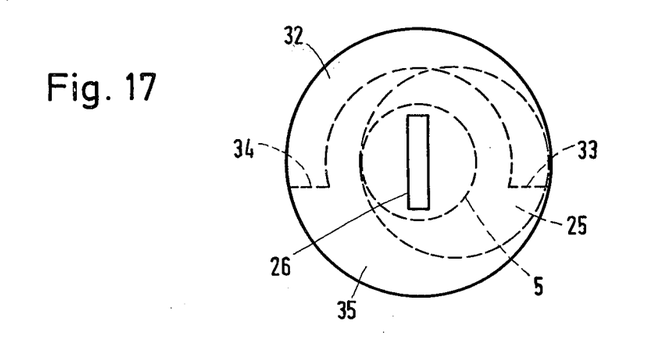
Figure 18:
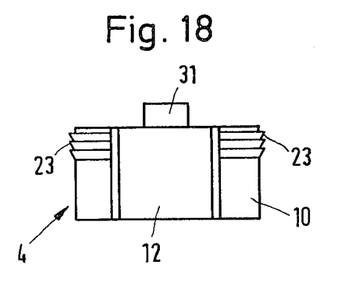
Figure 19:
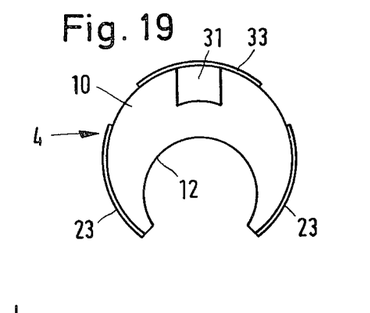
Figure 20:
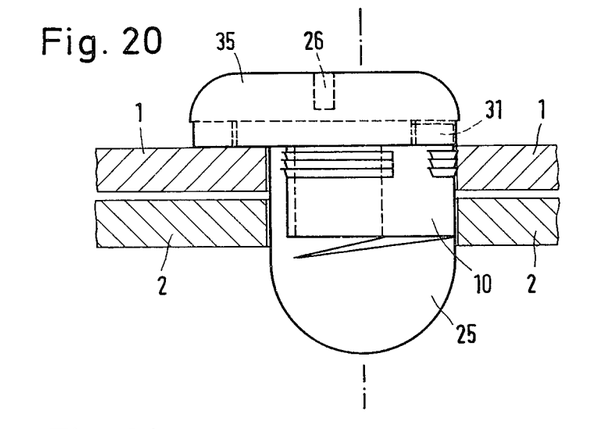
Figure 21:
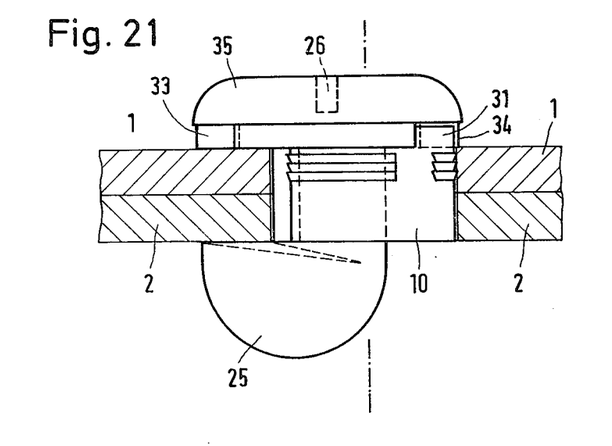

Since locking of the fastener causes the projection 25 of the retaining part 3 to become displaced from its position in which the said projection 25 is initially in flush alignment with the bush 10 (not illustrated), into the position shown in FIG. 14, the said rotating motion being accompanied by a lateral feed motion with respect to the panel 2, it is possible for the edge of the projection 25 to abut on the edge of the panel 2. This is avoided in the embodiment of the retaining part 3 as illustrated in FIGS. 10 and 12 by the provision of an inclined ramp on the side nearest to the component 2 on the projection 25 which is in flush alignment with the bush 10 on being inserted into the panels 1 and 2. At the beginning of its rotation with respect to the panel 25 the said ramp 27 provides the projection 25 with a specific clearance which diminishes progressively because of the angle of the ramp 27 until the surface 28 bears firmly on the surface 2 of the panel when the projection 25 is completely rotated so that the said panel is pressed against the panel 1. This ensures that the component illustrated in FIGS. 10 to 13 can be locked without difficulty even if a firm seating is desired.

The fastener illustrated in FIGS. 15 to 21 substantially corresponds to that illustrated in FIGS. 10 to 14 and the same reference symbols are thereof used for identical parts. However, the projection 35 with the slot 26 in the fastener according to FIGS. 15 to 21 is constructed in mushroom shape and in circular form so that the plan view of the projection 35 presents the viewer with a circular covering for the aperture disposed therebelow in the component 1. The locking part 4 is provided with the operating element 31 which projects in block form and disappears completely under the projection 35. To enable the retaining part 3 to be rotated with respect to the locking part 4, the projection 35 is provided with the recess 32 and the two stop abutments 33 and 34. The size of the recess 32 is such that the operating element 32 is able to move freely therein and the operating element 31 bears either on the stop abutment 33 or on the stop abutment 34 if the retaining part 3 and the locking part 4 are rotated relative to each other. If it bears on the stop abutment 33 the projection 25 will be in flush alignment with the bush 10 so that the fastener can be inserted through the apertures in the panels 1 and 2 (see FIG. 20). The locking position (see FIG. 21) in which the two panels 1 and 2 are retained together, will be obtained if the operating element 31 bears on the stop abutment 34.

It has already been mentioned that the locking part is advantageously injection moulded from plastics. The retaining part can also be advantageously moulded from plastics but it can also be die-cast from metal.

I claim:

1. A fastener device for the detachable connection of panel components through aligned apertures therethrough comprising in combination, a retaining means and a locking means; said retaining means comprising at one end thereof an enlarged head portion engaging one side of said panel components, a cylindrical shank portion coaxially aligned with said head portion and connecting at the other end thereof a foot portion, said foot portion being offset from the axis of said cylindrical shank portion; a locking means having a passage therethrough eccentrically disposed for reception of said cylindrical shank portion between said head portion and said foot portion, said shank being rotatable in said passage and substantially in alignment with said foot portion in a first predetermined position in said aligned aperture of said panel components to enable insertion of the fastening device through the aligned apertures of said panel components and upon rotation to a second predetermined position, said foot portion is displaced laterally out of alignment with said cylindrical shank portion thereby engaging the opposite side of said panel components to lock said panel components together.

2. A fastener according to claim 1 wherein said locking means having a passage therethrough eccentrically disposed for reception of said cylindrical shank portion between said head portion and said foot portion extends over the external surface of said shank portion so as to produce a crescent shaped cross-section thereto with slightly converging ends which engage resiliently around said shank.

3. A fastener according to claim 1 wherein said locking means has an operating element, in lever form projecting axially from said locking means.

4. A fastener according to claim 1 wherein said head portion of said retaining means has stop abutments whereby said cylindrical shank portion can be rotated through approximately 180° and one stop abutment providing to said cylindrical shank portion a position whereby said locking means and said foot portion of said retaining means are in coaxial alignment with each other.

5. A fastener according to claim 1 wherein the foot portion of said retaining means is lightly chamfered in the manner of a truncated cone adjacent said panel components.

6. The fastener according to claim 5 wherein said foot portion when in coaxial alignment with said locking means has a truncate form to produce a resilient zone.

7. A fastener according to claim 1 wherein the locking means is inserted into a panel component with a press fit and substantial friction prevents rotation of said retaining means and said locking means in a locked state thereof.

8. A fastener according to claim 1 wherein said retaining means and said locking means are constructed in barrelled form.

* * * * *